United States Patent
Jacobsmeyer

(10) Patent No.: US 6,755,464 B2
(45) Date of Patent: Jun. 29, 2004

(54) BICYCLE SEAT

(76) Inventor: Donald Jacobsmeyer, 1117 Timberline Dr., St. Louis, MO (US) 63122

( * ) Notice: Subject to any disclaimer, the term of this patent is extended or adjusted under 35 U.S.C. 154(b) by 0 days.

(21) Appl. No.: 10/247,022

(22) Filed: Sep. 19, 2002

(65) Prior Publication Data

US 2004/0090095 A1 May 13, 2004

(51) Int. Cl.⁷ .................................................. B62J 1/00
(52) U.S. Cl. ................................................... 297/195.1
(58) Field of Search ........................ 297/195.1, 195.11, 297/202, 214, 215, 215.15

(56) References Cited

U.S. PATENT DOCUMENTS

| | | | |
|---|---|---|---|
| 544,625 A | * 8/1895 | Montague | 297/195.1 |
| 3,874,730 A | * 4/1975 | Marchello | 297/452.63 |
| 4,099,769 A | 7/1978 | Jacobs | |
| D311,094 S | * 10/1990 | Scherer | D3/216 |
| 5,356,198 A | 10/1994 | Hughes | |
| 5,489,139 A | * 2/1996 | McFarland | 297/195.1 |
| 6,142,562 A | * 11/2000 | Varan | 297/201 |
| 6,409,130 B1 | 6/2002 | Maret | |

* cited by examiner

*Primary Examiner*—Peter R. Brown
(74) *Attorney, Agent, or Firm*—Polster, Lieder, Woodruff & Lucchesi, L.C.

(57) ABSTRACT

A bicycle seat (10) has first and second support members (12, 14) each with a proximal end (12a, 14a) attaching to a seat post (P) of a bicycle (B). The support members extend in opposite directions from the post from their proximal ends to a distal end (12b, 14b) which extends above the post. A pivot pin (16) is located at the distal end of each support member. A seat cover (18) comprises of a web of material extending between the distal ends of the support members, the cover being sufficiently strong to support the weight of a bicycle rider. The material fits on seat frame (20) which pivotally mounts the seat using the pivot pins for the seat to freely move under the weight of a bicycle rider and cushion the rider as the bicycle moves over uneven surfaces.

16 Claims, 2 Drawing Sheets

BICYCLE SEAT

CROSS REFERENCE TO RELATED APPLICATIONS

None

STATEMENT REGARDING FEDERALLY SPONSORED RESEARCH OR DEVELOPMENT

N/A

BACKGROUND OF THE INVENTION

This invention relates to bicycles, and more particularly, to a bicycle seat which comfortably supports the rider and protects him or her from road shock and vibrations.

Conventional, saddle-shaped bicycle seats provide little protection to a rider as they traverse rough terrain, curbs, or holes or depressions in pavement and other uneven surfaces. To avoid the jostling the rider and possibly injuring their buttocks or spine, the cyclist is often forced to pedal from a standing position. While this reduces some of the risk of injury, prolonged cycling from a standing position gets tiresome to the casual cyclist who engages in the sport for recreation, and lessens their enjoyment.

Attempts have been made to improve the bicycle seat. Different types of cushioning have been provided for the seat using springs of various types, for example. Other approaches involve the way the seat is framed and mounted to the post of the bicycle. See, for example, U.S. Pat. No. 5,597,202. While helping alleviate the problem, there is still a need for a bicycle which provides a comfortable seating for the rider regardless of the terrain over which the bicycle is ridden, thereby reducing rider fatigue and enhancing the enjoyment of the ride.

BRIEF SUMMARY OF THE INVENTION

A bicycle seat providing comfortable seating for a rider regardless of the terrain over which the bicycle is ridden. The seat reduces rider fatigue and enhances enjoyment of the ride. The seat includes two support members which extends from opposite sides of a collar or other bracket by which the seat is mounted to the seat post of the bicycle. Each support member has a proximal end which attaches to the seat mount. The support members curve upwardly from their proximal ends to a distal end which extends above the post. A pivot pin is formed on the support member at the distal end of each support member. A seat is comprised of a web of material which extends between the distal ends of the frame members. The material is sufficiently strong to support the weight of a bicycle rider. The material is attached to a seat frame which pivotally attaches the seat on the pivot pins for the seat to freely move under the weight of a bicycle rider and cushion the rider as the bicycle moves over uneven surfaces.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters Indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained In the above description or shown in the accompanying drawings shall be interpreted as illustrative and not in a limiting sense.

Figure 1:
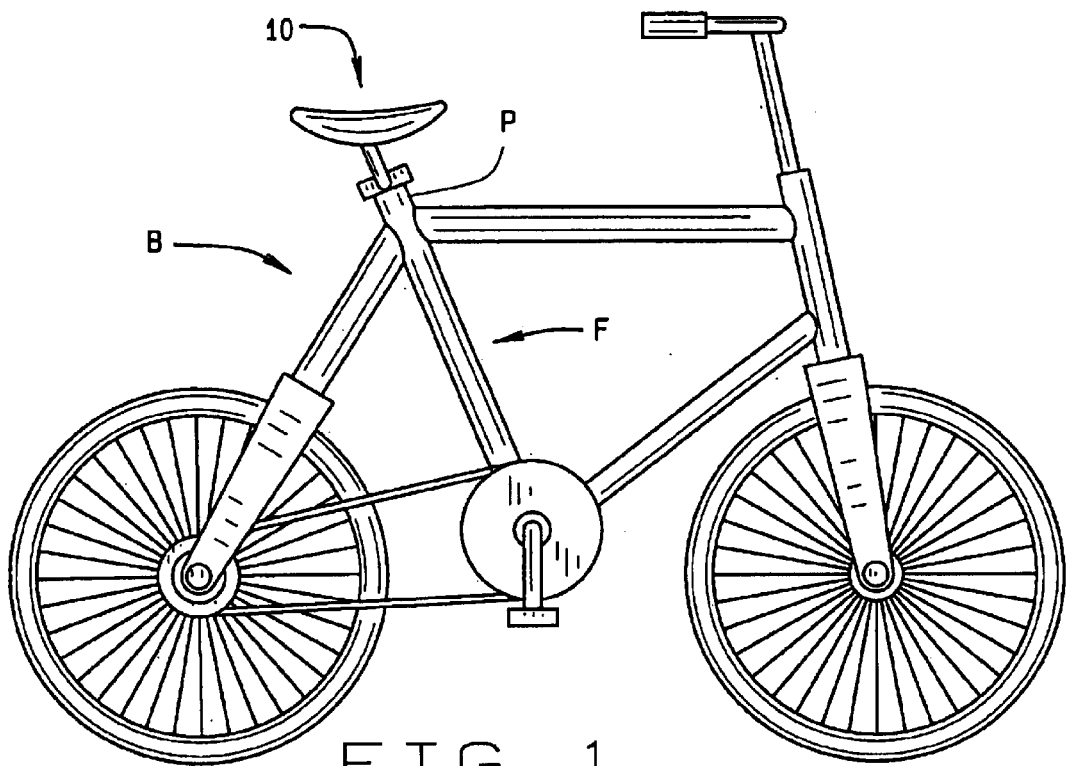
FIG. 1 is an elevation view of a bicycle with a seat of the present invention mounted on it.
Figure 2:
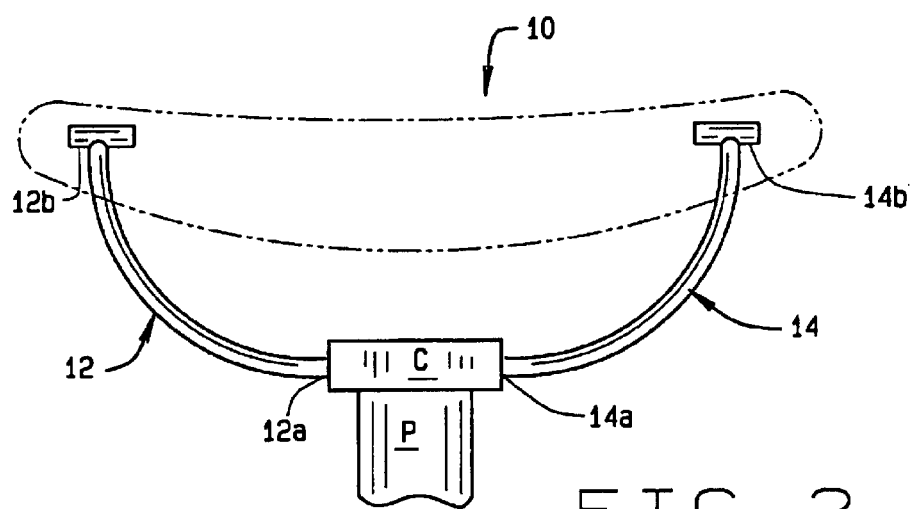
FIG. 2 is an elevation view of a portion of a seat post illustrating how the bicycle seat of the present invention is attached to the post.
Figure 3:
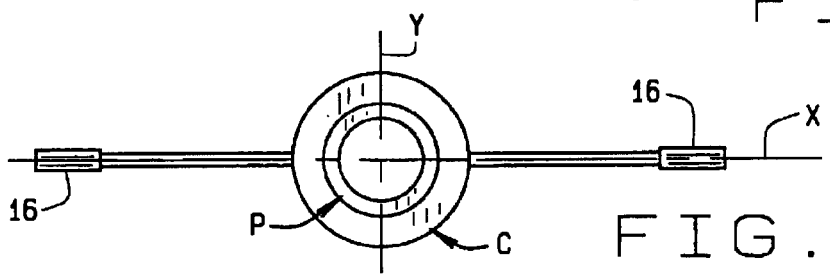
FIG. 3 is a top plan view of seat support members and a collar for mounting the seat to the post.

Referring to the drawings, a bicycle B includes a bicycle seat 10 of the present invention mounted on it. The bicycle frame F includes a seat post P to which seat 10 is mounted. In FIG. 2, seat 10 is shown to include first and second seat support members 12, 14 respectively. A collar C attaches to the top of seat post P in any convenient manner; for example, using a set screw (not shown). Each of the support members has a proximal end 12a, 14a respectively which is connected to collar C so to attach the support members to the seat post. The support members extend in opposite directions from post P. As shown in FIG. 2, each support member curves outwardly and upwardly from their proximal ends to a distal end 12b, 14b respectively. The distal ends of the support members extend above the height of the seat post. Seat support members 12 and 14 are formed of flexible metal or plastic material which is sufficiently strong so when a rider places their body weight on the seat, the seat will give enough to cushion the rider, but will not allow the support members to straighten to the point where the seat "bottoms our" against post P.

A pivot pin 16 is located at the distal end of each frame member. The pin is integrally formed with the frame member; or, the distal end of each frame member may form a bracket in which the pivot pin is received. The longitudinal axis X of the pivot pins is transverse to the longitudinal axis Y of the bicycle.

Figure 4A:
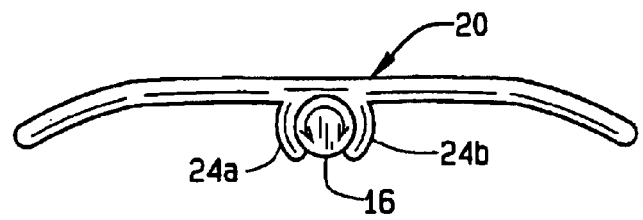
FIG. 4A is an elevation view of a seat frame for mounting the bicycle seat to the support and FIG. 4B is a plan view of the frame; and, FIGS. 5A and 5B are plan and elevation views respectively of a complete bicycle seat assembly.
Figure 4B:
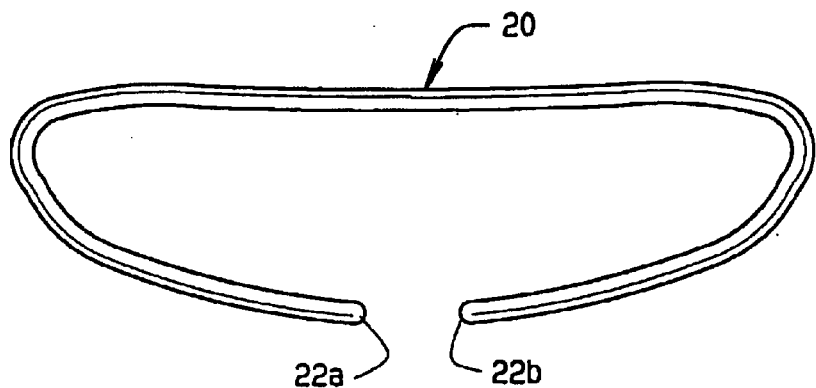

Seat 10 next includes a seat cover 18 comprising of a web of material attached to a frame 20 which mounts on the support members. The material is sufficiently strong so to support the weight of a bicycle rider when seated. The cover is sized to fit on a seat frame 20 which is rotatably mounted on the pivot pins 16 when the frame is attached to support members 12, 14. As shown in FIGS. 4A and 4B, frame 20 has an elongated C-shape. Ends 22a, 22b of the frame are located along a front extension or reach of the seat when the seat is mounted on the bicycle, the ends being adjacent the longitudinal axis of the bicycle. The frame curves outwardly and upwardly from the respective ends of the frame toward the outside of the seat assembly. The highest portion of the frame is where the frame attaches to the distal end of the respective support member 12, 14. At this location, a pair of curved arms 24a, 24b project downwardly from the underside of the frame forming a clip in which pivot pin 16 is received. The shape of the arms allows the pin to snap fit onto the underside of the frame with the seat cover/frame assembly now being supported by the distal ends of the support members. The rear portion of the frame slopes downwardly so the portion of the frame forming the back of the seat generally corresponds in height to the front of the frame.

The seat cover is secured to frame 20 in any convenient manner. The cover may have a seam 26 extending the circumference of the cover and forming a sleeve through which the frame is inserted. Alternately, the cover may be equipped with snap fittings by which the cover is laid over the frame and attached to the frame fitted about the frame. The seat cover can be a padded material to reinforce the cushioning provided by the seat. Or, it can be a resilient material which stretches when the rider places their weight on the seat. The material may include air holes to increase air circulation about the rider's body.

Figure 5A:
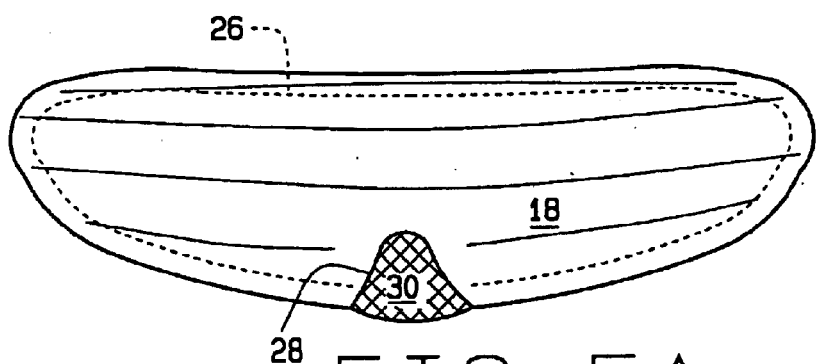
Figure 5B:
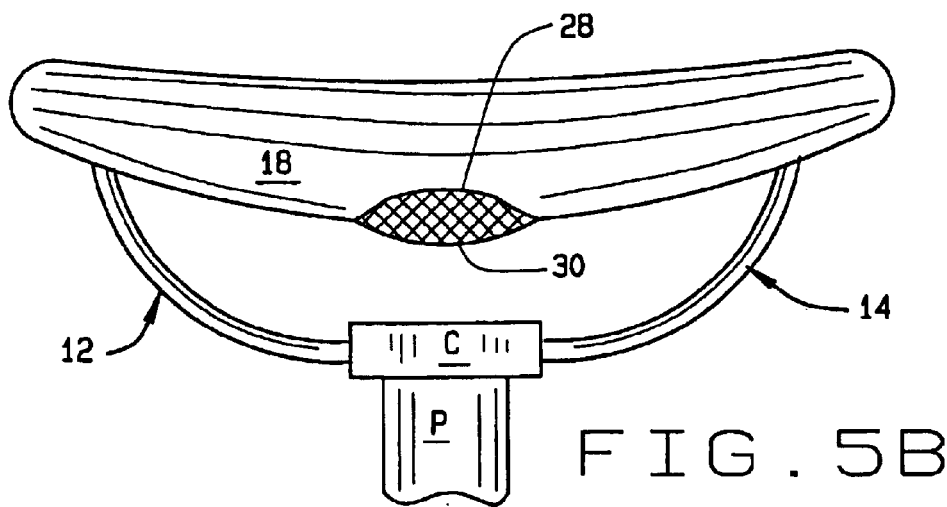

A feature of frame 20 is that there is a gap in frame which extends approximately between the inner portion of the thighs of the rider. His is as shown in FIG. 4B. In FIGS. 5A and 5B, the material for seat cover 18 is shown to have a notch 28 formed adjacent ends 22a, 22b of the frame. The notch is V-shaped and tapers from the edge of the cover inwardly. A mesh material 30 covers the notch. Frame 20, while sufficiently rigid to support the weight of the rider is also sufficiently flexible so the ends of the frame "give" with the weight of the rider. This mesh material prevents the rider's skin from being caught between the ends of frame 20 and keeps the rider from being pinched by the ends of the frame. The mesh material also facilitates air flow about the seat to cool the rider.

What has been described is a bicycle seat 10 which allows a rider to sit comfortably on the bicycle while pedaling from one place to another. If the rider leans forward or back, the seat pivots about pins 16 on the ends of the support members and stays in contact with the rider. Because the support members 12, 14 are flexible, they cushion the seat both with respect to side-to-side movement as well as with forward-to-back movement. This makes it easier for the rider to pedal over uneven, rugged terrain. While the rider will still move about as he or she covers the ground, seat 10 cushions the rider against the associated shock and vibrations, significantly reducing the amount of jostling to which the rider is subjected.

Those skilled in the art will understand that seat 10 is available in a variety of sizes, and that the shape of frame 20 may be somewhat more rounded than the shape shown in the drawings. Additionally, the seat is light in weight with both the support members and frame being of flexible, lightweight materials having sufficient springiness to absorb the shocks and vibrations produced when the bicycle is ridden over rough terrain.

In view of the above, it will be seen that the several objects and advantages of the present invention have been achieved and other advantageous results have been obtained.

Having thus described the invention, what is claimed and desired to be secured by Letters Patent is:

1. A bicycle seat comprising:
   a first support member and a second support member, the support members having a proximal end which attaches to a seat post of a bicycle, the support members extending in opposite directions from the post from their proximal ends to a distal end which extends above the post;
   a web of material forming a seat cover, the material being sufficiently strong to support the weight of a bicycle rider;
   a frame to which the cover is attached, the frame being pivotally mounted on the support members for the seat to freely move under the weight of a bicycle rider and cushion the rider as the bicycle moves over uneven surfaces; and,
   a pivot pin located at the distal end of each support member and integrally formed therewith, the frame fitting on the pivot pins to pivotally mount the frame on the support members.

2. The bicycle seat of claim 1 in which a longitudinal axis of the pivot pins extends transversely to a longitudinal axis of the bicycle.

3. The bicycle seat of claim 1 in which the frame further includes clips for attaching the frame onto the pivot pins.

4. The bicycle seat of claim 3 in which the clips are formed on the underside of the frame.

5. The bicycle seat of 3 in which the frame has an elongated C-shape with the ends of the frame being adjacent each other at the front of the seat and adjacent to a longitudinal axis of the bicycle.

6. The bicycle seat of claim 5 in which front and rear sections of the frame curve outwardly and upwardly toward the outside of the seat where the frame attaches to the support members.

7. The bicycle seat of claim 5 further including a notch formed in the seat cover and along the front of the seat between the ends of the frame, the notch helping prevent the rider from being pinched by the frame.

8. The bicycle seat of claim 7 in which the notch is a V-shaped notch tapering inwardly from a front edge of the seat cover.

9. The bicycle seat of claim 8 in which a mesh material covers the notch.

10. The bicycle seat of claim 1 further including a collar to which proximal ends of the support members attach, the collar being sized to fit on the seat post to secure the seat to the bicycle.

11. A bicycle seat comprising:
   a first support member and a second support member, the support members having a proximal end which attaches to a seat post of a bicycle, the support members extending in opposite directions from the post from their proximal ends to a distal end which extends above the post;
   a pivot pin integrally formed with each support member and located at the distal end of each support member; and,
   a seat cover and a frame to which the cover is attached, the frame being pivotally mounted on the pivot pins for the seat to freely move under the weight of a bicycle rider and cushion the rider as the bicycle moves over uneven surfaces.

12. The bicycle seat of claim 11 in which the frame has an elongated C-shape with the ends of the frame being adjacent each other at the front of the seat and adjacent to a longitudinal axis of the bicycle.

13. The bicycle seat of claim 12 in which front and rear sections of the frame curve outwardly and upwardly toward the outside of the seat where the frame attaches to the support members.

14. The bicycle seat of claim 13 further including a notch formed in the seat cover and along the front of the seat between the ends of the frame, the notch helping prevent the rider from being pinched by the frame.

15. The bicycle seat of claim 14 in which the notch is a V-shaped notch tapering inwardly from a front edge of the seat cover, a mesh material covers the notch.

16. The bicycle seat of claim 11 further including a collar to which proximal ends of the support members attach, the collar being sized to fit on the seat post to secure the seat to the bicycle.

* * * * *